United States Patent Office 3,687,850
Patented Aug. 29, 1972

3,687,850
HIGH TEMPERATURE INSULATING FIBER
Lawrence Vincent Gagin, Toledo, Ohio, assignor to Johns-Manville Corporation, New York, N.Y.
No Drawing. Filed Mar. 27, 1970, Ser. No. 23,442
Int. Cl. C03b 37/10; C03c 3/30, 25/06
U.S. Cl. 252—62
11 Claims

ABSTRACT OF THE DISCLOSURE

A glass fiber mass comprising long staple fibers having silica and alumina as the major constituents and which are substantially shot free, stable and resistant to devitrification at temperatures of about 2000 to 2300° F. The fibers are produced from base glasses and with techniques suitable for formation of long staple fibers and then subjected to treatments to alter their composition and structure for advantageous high temperature applications. The fibers are particularly suited for the manufacture of papers and felts.

BACKGROUND OF THE INVENTION

It has long been recognized that fibers of substantially pure silica can be produced by forming fibers from a glass such as type E glass having softening and melting characteristics suitable for convenient fiber formation and then leaching all but the silica from the fibers by immersing them in an aqueous solution of sufficient acidity to extract the acid soluble components. Such fibers were frequently found to be porous and to contain free water as well as chemically bound water. The treated fibers have been heated to dehydrate and shrink them. It has also been recognized that different physical characteristics can be achieved from fibers where the leaching has been controlled as to time, temperature and strength of the leaching agent.

SUMMARY OF THE INVENTION

The present invention involves a fiber composition and structure which is useful at temperatures of about 2000 to 2300° F. In particular, long staple fibers having silica and alumina as their major constitutents can be produced in fine diameters so that they have high tensile strength. These fibers when in a shot-free form offer improved insulating qualities and are particularly suitable for manufacture of paper without the need of additional binders.

Fine fibers can first be formed from a glass composition by weight of $SiO_2$ 45 to 60%, $Al_2O_3$ 12 to 18%, $B_2O_3$ 4 to 10%, $Na_2O$ and/or $K_2O$ up to 2%, and CaO and/or MgO 16 to 26%. These fibers have been produced in long staple form with average diameters of two thirds of a micron and average diameters of one and one-quarter micron. The long staple fibers are treated in sulfuric acid of about 0.75 pH at a temperature of about 200 to 210° F. for about four hours, then washed free of the acid immediately. The resultant product is of a composition by weight of 76.0 to 90.0% $SiO_2$, 4.0 to 8.0% $Al_2O_3$, 4.0 to 10.0% CaO, 1.0 to 4.0% MgO, up to 0.5% $Na_2O$ and/or $K_2O$, and 2.0 to 4.0% $B_2O_3$. The product exhibits a resistance to temperature up to 800° F. greater than the original material without degradation thereby permitting its use to 2000 to 2300° F.

Fibers produced by the techniques of directing jets of gas at glass filaments issuing from orifices or projected from the periphery of a rotor by centrifugal action and of the initial composition set forth can be formed in lengths substantially greater than the usual blown fibers.

Such long staple fibers generally correspond in length to those employed in staple yarns. They lend themselves to interlacing with each other when pulped in a beater or pulp mixer and provide a sufficient mechanical bond by virtue of their interlocking in the paper or felt that additional binders are unnecessary. This absence of binders is particularly desirable where the paper or felt is to be employed at high temperatures.

Devitrification of the fibers in the paper or felt is to be avoided at the maximum temperatures to which it is to be subjected. Thus, if the fibers devitrify, the paper or felt becomes brittle and weak even to the extent of disintegrating to a powder. The chemical and structural characteristics of the long staple fibers of this invention together with the absence of shot in the massed fibers enables a particularly useful high temperature product to be produced with substantial economic advantage over the prior essentially pure silica fiber high temperature products.

A higher yield of fibers is achieved by the present controlled and limited acid extraction of components other than silica. The processing can be accomplished in a shorter interval than employed for the production of substantially pure silica. As a result, products for the intermediate high temperature ranges, 2000 to 2300° F., as opposed to the up to 3000° F. range for pure silica, can be produced more economically and will be equal to or superior to the essentially pure silica in that intermediate high temperature range.

An object of this invention is to improve the physical characteristics, particularly tensile strength, ability to knit into a paper or felt, and avoidance of crystallization, of silica fibers for use at temperatures up to the range of 2000 to 2300° F.

Another object is to produce long staple, fine fibers which are effective at 2000 to 2300° F. Such fine fibers are more efficient for insulation than coarser fibers.

A third object is to produce a relatively uniform diameter staple fiber which is free of shot and non-fibrous material.

A fourth object is to eliminate the need of binders in high temperature felt or paper made of glass fibers.

A fifth object is to reduce the loss of material incidental to the leaching of constituents for siliceous fibers.

A sixth object is to shorten the interval for processing siliceous fibers.

In accordance with the above objects, one feature of the invention is a long staple fiber composed of silica and alumina with other oxide constituents derived from glass fibers. Such a fiber is formed from a glass composition which is more readily fiberized than the final high temperature composition.

Another feature involves the leaching extraction of certain components from fibers of a glass of composition which facilitates long staple fiber formation while retaining essentially all the silica and substantial quantities of other components.

DESCRIPTION OF THE PREFERRED EMBODIMENT

Fine long staple glass fibers of about one micron average diameter and essentially free of shot can be formed by known techniques from glass compositions of the following percentages by weight.

| | Percent |
|---|---|
| Silica ($SiO_2$) | 45 to 60 |
| Aluminum oxide ($Al_2O_3$) | 12 to 18 |
| Boric anhydride ($B_2O_3$) | 4 to 10 |
| Alkali oxide ($Na_2O$ and/or $K_2O$) | 0 to 2 |
| Calcium oxide and/or magnesium oxide (CaO and/or MgO) | 16 to 26 |

One starting composition which has been employed comprised:

| | Percent |
|---|---|
| Silica ($SiO_2$) | 55 |
| Aluminum oxide ($Al_2O_3$) | 15 |
| Boric anhydride ($B_2O_3$) | 8 |
| Calcium oxide (CaO) | 17 |
| Magnesium oxide (MgO) | 5 |

In the general range of starting compositions, however, other components such as fluorine and oxides can be added in small amounts to help melting of the glass. The additional oxides include traces of the oxides of titanium and iron. Substitution of other oxides in the same chemical groups as the major constituents is also acceptable. Thus $Li_2O$ can be substituted for $Na_2O$, and BaO can be substituted for CaO and/or MgO.

The properties which dictate the starting compositions to form fibers are: economical consideration; the production of long fibers, a material permitting rapid acid leaching in fiber form, a material which provides a high yield of final product with minimum loss in acid treating, and a material which optimizes handling and drying of the fibers. More particularly, the glass should have a high softening point, in the range of 1500° F. and a low viscosity at high temperature in order to provide the desired fiber characteristics with very low shot content. Economic considerations dictate a composition with as high a silica content as possible in the range indicated. Where the fibers are to be flame attenuated, enough $B_2O_3$ and alkali oxides are desirable to keep the liquidus temperature in the range where present techniques of attenuation can be effective. A rapid acid treatment is achieved by maintaining the ratio of the total CaO and MgO to $SiO_2$ between 1 to 2 and 1 to 3.

Flame attenuated fiber of 1 micron average diameter and of the basic composition of 55% silica, 15% alumina, 8% boric anhydride, 17% calcium oxide, and 5% magnesium oxide, has been processed for high temperature utilization by treating the fibers in sulfuric acid of about 0.75 pH at a temperature of about 200 to 210° F. for about four hours. The fibers are immersed in a quantity of the acid sufficient to maintain the liquid acidic and can be agitated occasionally to insure that the conditions are maintained essentially constant throughout the mass of fibers subjected to the treatment. Immediately after the treatment, the fibers are washed in water until free of acid. This produces a filament structure which is somewhat porous.

The leached and washed long staple fiber can have the following by weight composition for 2000 to 2300° F. paper and felt:

| | Percent |
|---|---|
| Silica ($SiO_2$) | 76.0 to 90.0 |
| Alumina ($Al_2O_3$) | 4.0 to 8.0 |
| Calcium or in-part barium oxide (CaO or BaO) | 4.0 to 10.0 |
| Magnesium oxide (MgO) | 1.0 to 4.0 |
| Potassium or sodium oxide ($K_2O$ or $Na_2O$) | 0 to 0.5 |
| Boric anhydride ($B_2O_3$) | 2.0 to 4.0 |

The fibers as processed above can be held in bulk for future utilization, they can be dried at low temperatures (about 300° F.) and stored, they can be procesed directly to the ultimate product, or they can be subjected to a dehydrating and shrinking heat treatment, and thereafter processed.

The reasons for the favorable high temperature characteristics of the fibers are not fully understood. It is theorized that the chemical composition and structural status of the treated fibers are both influential in producing the desired characteristics. The somewhat porous structure of the fibers entraps some free water and gives rise to shrinkage when they are subjected to higher temperatures. Accordingly, after acid treating and washing the fibers can be heat treated at about 1500 to 1600° F. to remove both free and chemically bound water, to consolidate the structure and to reduce shrinkage. Thereafter the fibers can be pulped for paper and subjected to papermaking procedures to produce a product which, due to its long staple fibers, requires no binder and thus is a paper composed solely of glass, is flexible, and retains a high tensile strength in the range of 2000° to 2300° F. Alternatively, the fibers can be formed into a felt by conventional techniques.

When heat treated fibers are formed into paper or a felt, their shrinkage is reduced when subjected to their ultimate utilization temperatures. If the fibers are not heat treated, they can be formed into paper or felt, but shrinkage will occur the first time the paper or felt is heated to the high temperatures. Accordingly, it should be understood that the acid treated and washed fibers can be a product of commerce, such fibers in a dried state can also be a product of commerce, or the fibers can be heat treated for sale as a commercial product. Experience indicates that a superior paper results from heat treatment subsequent to the formation of the paper or felt.

Best knitting of the fibers into a paper or felt is achieved when the fibers have not been subjected to a heat treating operation. However, the resultant paper or felt exhibits substantial shrinkage. Where shrinkage is tolerable, the fibers should be subjected to a pulping operation after they have been washed. A tradeoff of reduced shrinkage against loss in tensile strength of the end product is made incidental to the heat treating. Thus, when heat treated as bulk fiber, the fibers should be heat treated only to the degree (i.e., both as to temperature and time) to afford acceptable shrinkage in the ultimate product. In one example, the bulk fiber is heat treated at 1500° F. for about five minutes prior to pulping for paper production.

It is believed to be understood that the composition of the ultimate fiber can vary as to minor constituents provided its silica content is in the range of 76.0 to 90.0% by weight, its alumina content is in the range of 4.0 to 8.0% by weight, and the fibers are long staple and of about a micron diameter. The minor constituents can include boron, lithium, calcium, magnesium, sodium, potassium and barium oxides in total constituting less than 20% by weight of the glass with the preponderant minor constituent of the group calcium or barium oxide. Further, the degree of heat treatment of the leached and washed fibers is variable and is dependent upon the characteristics desired in the ultimate product with minimum time and/or temperature of heat treatment affording maximum interlinking of the fibers in the pulp from which the paper or felt is derived and resulting in the greatest strength and greatest shrinkage when the paper or felt is subjected to rated temperatures.

What is claimed is:

1. A glass fiber mass comprising long staple fibers of about one micron average diameter and comprising 76.0 to 90.0% by weight silica and 4.0% to 8.0% by weight alumina which will retain its form at 2000° F., will not devitrify and lose its flexibility when held at 2000° F. for a substantial time interval, and which is derived by acid leaching glass fibers comprising by weight 45 to 60% silica, 12 to 18% aluminum oxide, 4 to 10% boric anhydride, up to 2% sodium oxide and/or potassium oxide, and 16 to 26% calcium oxide and/or magnesium oxide.

2. A mass according to claim 1 wherein said fibers include oxides of the alkaline earths in total not greater than 14.5% by weight.

3. A mass according to claim 1 wherein said fibers include from 2.0 to 4.0% by weight of boric anhydride.

4. A mass according to claim 1 wherein said fibers comprise by weight in addition to said silica and said alumina, 4.0 to 10.0% calcium oxide, 1.0 to 4.0% magnesium oxide, up to 0.5% sodium oxide, and 2.0 to 4.0% boric anhydride.

5. A glass fiber mass according to claim 1 which has been heat treated to a range of about 1500 to 1600° F.

6. A glass fiber mass according to claim 1 which has been pulped and dried in felted form.

7. A felted body consisting of the glass fiber mass of claim 1.

8. A glass fiber mass comprising long staple fibers of about one micron average diameter and comprising 76.0 to 90.0% by weight silica and 4.0 to 8.0% by weight alumina which has been heat treated to a range of about 1500 to 1600° F. and then pulped and dried in felted form.

9. A mass according to claim 8 wherein said fibers include oxides of the alkaline earths in total not greater than 14.5% by weight.

10. A mass according to claim 8 wherein said fibers include from 2.0 to 4.0% by weight of boric anhydride.

11. A mass according to claim 8 wherein said fibers comprise by weight in addition to said silica and said alumina, 4.0 to 10.0% by weight calcium oxide, 1.0 to 4.0% by weight magnesium oxide, up to 0.5% by weight sodium oxide, and 2.0 to 4.0% by weight boric anhydride.

References Cited

UNITED STATES PATENTS

| | | | |
|---|---|---|---|
| 2,640,784 | 6/1953 | Tiede et al. | 106—50 |
| 3,508,939 | 4/1970 | Laurent et al. | 106—52 X |
| 2,830,000 | 4/1958 | Labino | 106—50 X |
| 2,882,173 | 4/1959 | Welsch | 106—50 |
| 2,883,296 | 4/1959 | Labino | 106—50 |
| 3,311,481 | 3/1967 | Sterry et al. | 106—63 X |
| 3,348,956 | 10/1967 | Ekdahl | 106—69 X |
| 3,385,915 | 5/1968 | Hamling | 106—62 X |
| 2,643,437 | 6/1953 | Parker | 65—4 X |
| 3,576,653 | 4/1971 | Miller et al. | 106—65 X |
| 3,597,246 | 8/1971 | McMarlin | 106—50 |
| 3,600,147 | 8/1971 | McKinnis et al | 65—31 |
| 3,607,322 | 9/1971 | Brady | 106—50 X |
| 3,615,759 | 10/1971 | Busdiecker et al. | 106—52 |
| 3,620,787 | 11/1971 | McMarlin | 106—50 X |
| 3,560,177 | 2/1971 | Lajarte et al. | 161—169 X |

HAROLD ANSHER, Primary Examiner

U.S. Cl. X.R.

65—9, 31; 106—50, 52, 62, 63, 69; 161—169; 162—3, 9, 156